United States Patent [19]

Shimomura

[11] Patent Number: 4,974,069
[45] Date of Patent: Nov. 27, 1990

[54] APPARATUS FOR AUTOMATICALLY ADAPTING AN INPUT VIDEO SIGNAL FOR A COLOR PRINTING DEVICE

[75] Inventor: Shinzo Shimomura, Mie, Japan

[73] Assignee: Shinko Electric Co., Ltd., Tokyo, Japan

[21] Appl. No.: 272,897

[22] Filed: Nov. 18, 1988

[30] Foreign Application Priority Data

Nov. 19, 1987 [JP] Japan .................. 62-290613

[51] Int. Cl.$^5$ .................................... H04N 1/46
[52] U.S. Cl. ......................... 358/75; 358/78; 358/138; 358/445; 358/479
[58] Field of Search .............. 358/75, 78, 11, 140, 358/138, 479, 445

[56] References Cited

U.S. PATENT DOCUMENTS 4,734,790  3/1988  Pajus et al. ...................... 358/310
4,752,823  6/1988  Takahashi et al. ................ 358/80

*Primary Examiner*—Howard W. Britton
*Attorney, Agent, or Firm*—Wenderoth, Lind & Ponack

[57] ABSTRACT

A video signal hard copying apparatus for printing on a copying sheet of paper input color video signals including R, G, B signals, and horizontal and vertical synchronizing signals as a color image signal includes D/A converter means for generating reference voltages each changing stepwise, comparator means for comparing the color image signal with the reference voltages to provide digital signal patters composed of logical "0s" and/or logical "1s" indicative of the state of the color image signal, and memory means for temporarily storing the digital signal patterns for later associated processings.

An automatic setting apparatus for generating a video signal sampling clock in the video signal hard copying apparatus includes display means for displaying marks thereon separated by a predetermined drawn distance, memory means for storing the predetermined drawn data, storage state judging and adjusting means for judging whether or not the drawn distance is stored at a correct location in the memory means which location is estimated by the storage state judging and adjusting means itself, and further outputting a frequency dividing ratio setting signal, and frequency multiplier means for generating a sampling clock for sampling the input video signal, the sampling clock being employed for the foregoing judgement by the storage state judging and adjusting means until a correct sampling clock is established.

6 Claims, 7 Drawing Sheets

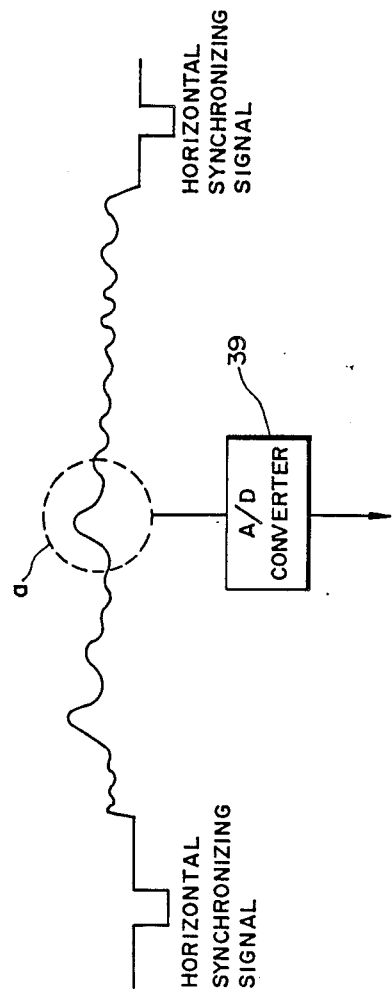
FIG. 5
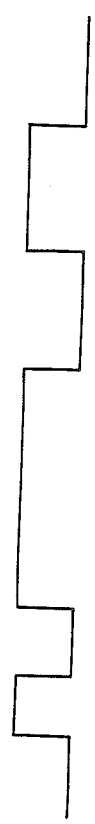
FIG. 6(a) DIGITAL VIDEO SIGNAL CONVERTED TO DIGITAL DATA DI
FIG. 6(b) SAMPLING CLOCK FROM FRAME BUFFER 43
FIG. 6(c) SAMPLING DATA

APPARATUS FOR AUTOMATICALLY ADAPTING AN INPUT VIDEO SIGNAL FOR A COLOR PRINTING DEVICE

BACKGROUND OF THE INVENTION

1. Field of the Invention:

The present invention relates to a video signal hard copying apparatus capable of automatically setting a sampling clock for a video signal, and of being connected to varieties of computers by automatically adjusting the characteristics of unknown signals such as levels, scanning systems and logics.

2. Description of the Prior Art:

Recent development of small computers requires graphical representation with the need of a color hard copying apparatus to exhibit and record any graphical data. Many makers manufacture those small computers of all sorts. It is accordingly needed for the color hard copying apparatus additionally provided in those computers not to be affected by specifications and characteristics of those computers. Thereupon, the color hard copying apparatus electronically processes a video signal composed of three primary colors displayed on a CRT screen, and prints out the signal as a color image. Such a video signal however occupies a wide frequency band of for example 100 MHz. Additionally, the video signal is not necessarily standardized in its signal level and in its transmission signal format for a synchronizing signal. Skilled artisans must therefore operate the color hard copying apparatus for installation, phase and level adjustment, and selection of synchronizing signal lines, etc. To solve this difficulty, there is known an automatic color hard copying apparatus, which is capable of automatically setting video signal levels, phases of R, G, B signals, and data regions to be incorporated therein. However, video hard copying apparatuses of this type suffer from the following problems. The automatic setting function is limited for example to phase correction for high frequency video signals or to detection of white and black levels of the same, etc, only for the purpose of avoiding variations of the operation in the same computer. That is, the apparatus is incapable of connection to varieties of computers without limitation, requiring costly design and manufacture thereof for each computer.

Additionally, such a video hard copying apparatus is supplied with a sampling clock for sampling the video signal, from the outside or from a frequency multiplier having a phase-locked loop (PLL) provided therein. The phase-locked loop is well known and includes, as illustrated in FIG. 8, a phase comparator 1 for receiving at one input a horizontal synchronizing signal Sh transmitted from a video terminal at one input thereof and an output Sd from a frequency divider 2 described later at the other input, comparing phases of both signals Sh and Sd, and outputting a pulse signal Sp with its width corresponding to a difference between both phases compared as such to a low-pass filter 3. The low-pass filter 3 transmits DC voltage Sc extracted therethrough from the pulse signal Sp to a voltage-controlled oscillator 4 (hereinafter referred to as a VCO), which then outputs a pulse train So with a frequency corresponding to the DC voltage Sc input thereinto to the foregoing frequency divider 2. The frequency divider 2 divides the pulse train So by a predetermined dividing ratio N and outputs the output Sd so divided. The prior PLL however has a problem of its being incapable of generating a sampling clock signal possessing the same frequency and phase as those of the horizontal synchronizing signal Sh unless being informed of accurate dividing ratio data. Such dividing ratio data is made clear with reference to a manufacturing drawing of the video terminal or to the details of the specification of the same. This is not accessible to ordinary users. It is therefore difficult to establish the same signal as the clock signal at the video terminal.

SUMMARY OF THE INVENTION

In view of the drawbacks of the prior art, it is an object of the present invention to provide a video signal hard copying apparatus capable of connection to varieties of computers without the need of any adjustment.

Another object of the present invention is to provide a video signal hard copying apparatus capable of being informed of frequency dividing ratio data with ease and automatically setting a clock signal most suitable for sampling a video signal.

To achieve the above objects, a video signal hard copying apparatus for printing on a copying sheet of paper an input color video signal including R, G, B signals, and horizontal and vertical synchronizing signals, according to the present invention, comprises: first and second input signal selection means connected correspondingly to input terminals for the R, G, B signals and to an input terminal for the horizontal synchronizing signal, for selecting as required any the R, G, B signals and of the horizontal signal or those signals in combination; first, second and third digital-to-analog converter means for generating first, second and third reference voltages each changing stepwise; first comparator means connected at one input to the input signal selection means for the R, G, B signals and connected at the other input to the first digital-to-analog converter means for comparing the R, G, B signals selected by the first input signal selection means with the first reference voltage and outputting a digital signal pattern composed of logical "0s" and/or logical "1s" indicative of the states of the R, G, B signals; second comparator means connected at one input to the input signal selection means for the horizontal synchronizing signal and connected at the other end to the second digital-to-analog converter means for comparing the B signal selected by the first input signal selection means and the horizontal synchronizing signal with the second reference voltage and outputting a digital signal pattern composed of "0s" and/or "1s" indicative of the states of the B signal and the horizontal synchronizing signal; third comparator means connected at one input to an input terminal for the vertical synchronizing signal and connected at the other end to the third digital-to-analog converter means for comparing the vertical synchronizing signal with the third reference voltage and outputting a digital signal pattern composed of "0s" and/or "1s" indicative of the states of the vertical synchronizing signal; and first, second and third multiplexer means connected respectively and correspondingly to the first, second and third comparator means for selecting and outputting one of the digital signal patterns output respectively from the first, second and third comparator means.

Additionally, in accordance with the other aspect of the present invention, an automatic setting apparatus for generating a video signal sampling clock for use in a video signal hard copying apparatus for printing on a copying sheet of paper an input color video signal including color signals R, G, B, and horizontal and vertical synchronizing signals, the automatic setting apparatus comprises: display means for displaying thereon predetermined first and second marks involved in the video signal being input at left and right ends thereof separated by a predetermined distance; memory means connected to the display means for previously storing the predetermined distance and for permitting first and second addresses thereof at which the first and second marks are stored to be specified corresponding to the predetermined distance previously stored therein; frequency multiplier means composed of a phase-locked loop and a frequency divider for receiving the horizontal signal involved in the color video signal transmitted from an external video terminal and a frequency dividing ratio setting signal, and automatically adjusting and generating a correct sampling clock for the color video signal on the basis of the frequency dividing ratio setting signal; write address setting means connected to the memory means for setting the first address to the memory so as to coincide with an address at which one end of the predetermined distance corresponding to the first mark is stored upon starting of the operation from the outside therethrough, and thereafter generating the second address incrementing stepwise and setting the same to the memory means; and storage state judging and adjusting means connected to the display means, memory means, frequency multiplier means, and write address setting means for judging whether or not the second address for the second mask coincides with the other end of the predetermined distance, on the basis of the image information concerning the first and second marks transmitted from the display means and of the predetermined mark distance information transmitted from the memory means, and when no coincidence is judged in the judging step, adjusting, generating transmitting an expectation address to the write address setting means and further transmitting the frequency dividing ratio setting signal corresponding to the expectation address to the frequency multiplier means, the write address setting means generating the second address on the basis of the expectation address to set it to the memory, until the second address coincide with the other end of the predetermined distance and hence until the frequency dividing ratio setting signal is correctly specified for generation of the correct sampling clock in the frequency multiplier means.

The above and other objects, features and advantages of the present invention will become more apparent from the following description when taken in conjunction with the accompanying drawings in which preferred embodiment of the present invention are shown by way of illustrative example.

BRIEF DESCRIPTION OF THE DRAWINGS

FIG. 5 is a view illustrating a video signal output from a video terminal;

FIGS. 6(a), 6(b) and 6(c) are a view illustrating a timing relation among the video signal after being converted to digital data, a sampling clock for sampling the video signal so converted, sampling data, and shift data;

DESCRIPTION OF THE PREFERRED EMBODIMENTS

Referring here to the accompanying drawings, a first embodiment of the video signal hard copying apparatus of the present invention will be described.

Figure 1:
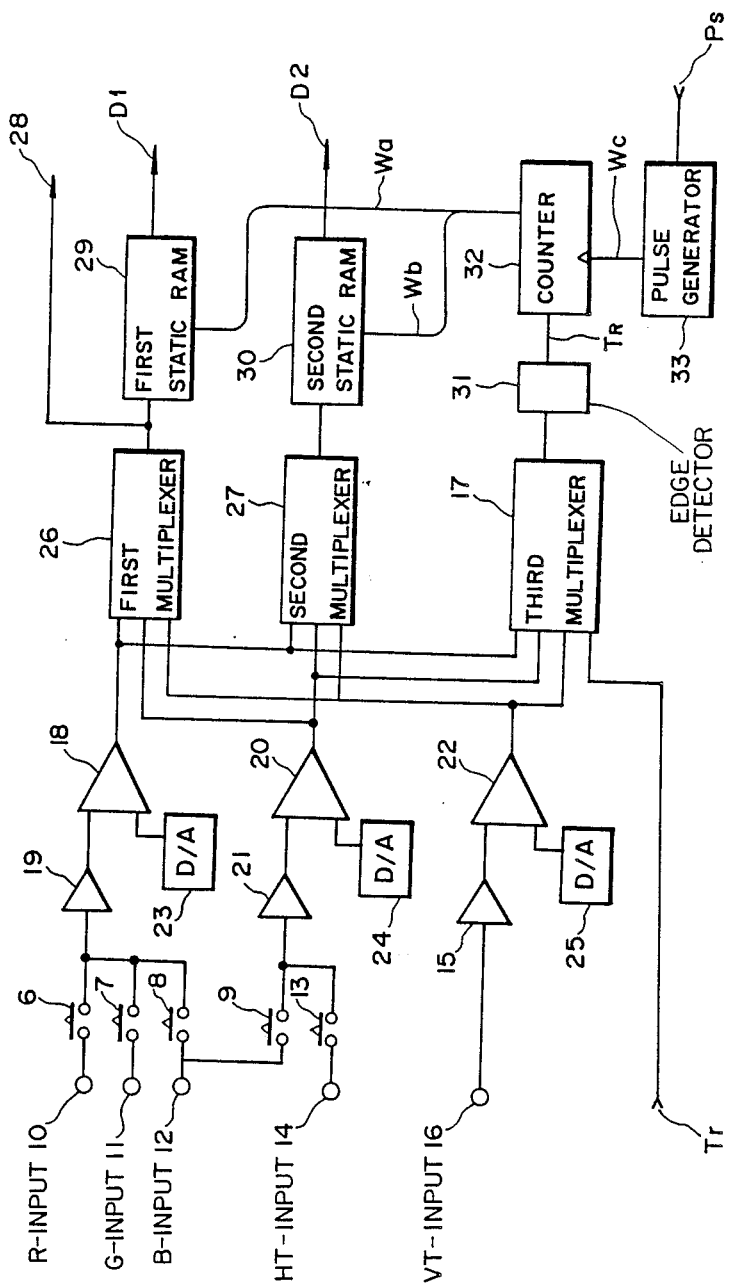
FIG. 1 is a block diagram illustrating an embodiment of a video signal hard copying apparatus which is devised in particular to be connected to varieties of computers without the need of any adjustment.

Referring to FIG. 1, video color signals R, G and B are inputted into relays 6, 7 and 8 which comprises first input signal selection means and into a relay 9 which comprises second input signal selection means, via input terminals 10, 11 and 12. A horizontal synchrozining signal HT is inputted into a fifth relay 13 via a fourth input terminal 14. A vertical synchronizing signal VT is inputted into a third buffer amplifier via a fifth input terminal 16. Additionally, a CPU trigger signal Tr is inputted into a third multiplexer 17. The relays 6, 7, 8 are respectively independently closed for selection of a corresponding one among the video signals R, G, B. The selected video signals R, G, B are inputted into a first comparator at one input thereof via a first buffer amplifier 19. Likewise, the selected video signal B and the selected horizontal synchronizing signal HT are inputted into a second comparator 20 at one input thereof via a second buffer amplifier 21. The vertical synchronizing signal VT inputted into the third buffer amplifier 15 is transmitted to a third comparator 22 at one input thereof. The first, second and third buffer amplifiers 19, 21, and 15 are of the type of level clamping to stably supply the associated signals to the first, second and third comparators 18, 20 and 22. First, second and third digital-to-analog converters 23, 24 and 25 are connected to the first, second and third comparators 18, 20 and 22 at the other inputs thereof for generating 256 steps of arbitrary voltages on the basis of instructions from a CPU (not shown), and delivering those voltages to the first, second and third comparators 18, 20 and 22 as reference voltages. The comparators 18, 20 and 22, which receive the reference voltages at the other inputs thereof, compare the aforementioned video signals R, G, B including the horizontal and vertical synchronizing signals HT and VT with those received reference voltages, and output logical signals "1" when the formers are greater than the latters, while outputting logical signals "0" in the opposite case. The logical signals "1" and/or "0" are respectively transmitted to first, second and third multiplexers 26, 27 and 17 which in turn select and deliver one of those digital signals to an output terminal 28, first and second high speed static random access memories (RAMs) 29 and 30, and an edge detector circuit 31. Output data D1 and D2 from the first and second static RAMs 29, 30 are transmitted to CPU input ports (not shown). A counter 32 generates and transmits write address signals Wa and Wb to the first and second static RAMs 29 and 30 according to a trigger signal $T_R$ from the edge detector circuit 31 and a write clock Wc input thereto. A pulse generator 33 generates the write clock Wc according to an externally supplied pulse selection signal Ps supplied input thereto. The write clock Wc specifies the rate of write operations of the first and second static RAMs 29, 30.

In what follows, the operation of the first embodiment will be described wherein video interface signal conditions at a video terminal are automatically established.

First, an external computer system is operated to display an arbitrary picture image on a video display. The input terminals 10 through 12, 14 and 16 are previously connected respectively to R, G, B color video signal lines of the computer system.

First Step

Measurement of the type and the level of any video signal.

There are four types of the video signals: [1] (R, G, B, HT, VT, all separated), [2] (R, G, B, HT+VT in combination), [3] (R, B, G+HT+VT; the synchronizing signals HT+VT in combination with the order signal G), and [4] (R+HT+VT, G+HT +VT, B+HT+VT; all R, G, B in combination with the synchronizing signals HT+VT). These signals will be judged.

In FIG. 1, a color video signal is output through the second comparator 20, first multiplexer 26, and the output terminal 28 from the second buffer amplifier 21 after switching off the fourth relay 9 and on the fifth relay 13, which is in turn read bY a CPU (not shown) therein. Here, the second D/A converter 24 increments gradually its output from 0 V in the step of 100 mV. Thereupon, with only a signal pattern constituted by a series of "1s" and/or "0s" appearing at the output terminal 28, it is judged that no synchronizing signal is inputted into the horizontal synchronizing signal input terminal 14. Thus, the kind of the input signal is judged to be (R+HT+VT, G+HT+VT, B+HT+VT) or (R, B, G+HT+VT).

With a regular pattern of "1s" and/or "0s" appearing at the output terminal 28, the synchronizing signal HT or HT+VT is judged to be inputted into the horizontal synchronizing signal input terminal 14. Then, the CPU (not shown) reads therein a signal inputted into the vertical synchronizing signal input terminal 16 transmitted through the third buffer amplifier 15, third comparator 22, first multiplexer 26, and input terminal 28, and judges any synchronizing signal to be inputted into the vertical synchronizing signal input terminal 16. The CPU thereupon judges a reference voltage from the third D/A converter 25, which voltage permits any pattern of "1" and/or "0" to disappear at the output terminal 28, to be the maximum level of the synchronizing signal.

Provided no signal is inputted into the vertical synchronizing signal input terminal 16, HT+VT are assumed to be inputted into the horizontal synchronizing signal input terminal 14. Provided no signal is inputted into the terminal 14 while any signal is inputted into the terminal 16, the CPU issues an error indication and interrupts the automatic setting operation.

Provided no signal is inputted into the terminals 14 and 16, the CPU issues a message instructing all displays on the side of the external video terminal to be interrupted, and investigates whether or not any regular pattern of "1" and/or "0" appears through three routes of the video color signal R input terminal 10, relay 6, first buffer amplifier 19, first comparator 18, first multiplexer 26, and output terminal 28, of the video color signal G input terminal 11, relay 7, first buffer amplifier 19, first comparator 18, first multiplexer 26, and output terminal 28, and of the video color signal B input terminal 12, relay 8, first buffer amplifier 19, first comparator 18, first multiplexer 26, and output terminal 28, in the same manner as in the judgement of HT and VT. Thereupon, with any regular pattern of "1s" and/or "0s" appearing, that pattern is judged to be a composite signal including any synchronizing signal. When no synchronizing signal is found in the video color signals R, G, B, the CPU interrupts its processing as with any error being produced.

Hereupon, the reference voltage from the first D/A converter 23 is finely changed in the vicinity of the boundary between "1" and "0" appearing to previously detect the levels of only the synchronizing signal components. The maximum values of the video color signals R, G, B can be determined in a second step (described later). A true video signal level can thus be estimated by subtracting the synchronizing signal level described above from those maximum values of the video color signals R, G, B.

Second Step

Detection of the level and logic of any of the video signal, and of a timing relation between the synchronizing signals.

First, a video signal with the maximum luminance is drawn on the external video terminal over the full display area thereof to the utmost. Then, the reference voltage of the first D/A converter 23 is stepped up in the minimum unit through the route of the (video color signal) R input terminal 10, relay 6, first buffer amplifier 19, first comparator 18, first multiplexer 26, and output terminal 28 to determine the reference voltage of the first D/A converter 23 which voltage permits the output at the output terminal 28 to become zero. This is to detect the maximum level of the input video color signal R. Similarly, the maximum levels of the input video color signals G and B are detected through the routes of the G input terminal 11, relay 7, first buffer amplifier 19, first comparator 18, first multiplexer 26, and output terminal 28, and of the B input terminal 12, relay 8, first buffer amplifier 19, first comparator 18, first multiplexer 26, and output terminal 28.

Successively, a method of detecting the level and logic of the input video signal including HT and VT or HT +VT will be described. However, prior to this, level detection and timing measurement with use of the first and second static RAMs 29, 30 will be described with reference to FIG. 2, because of both methods employ the same procedure.

Figure 2:
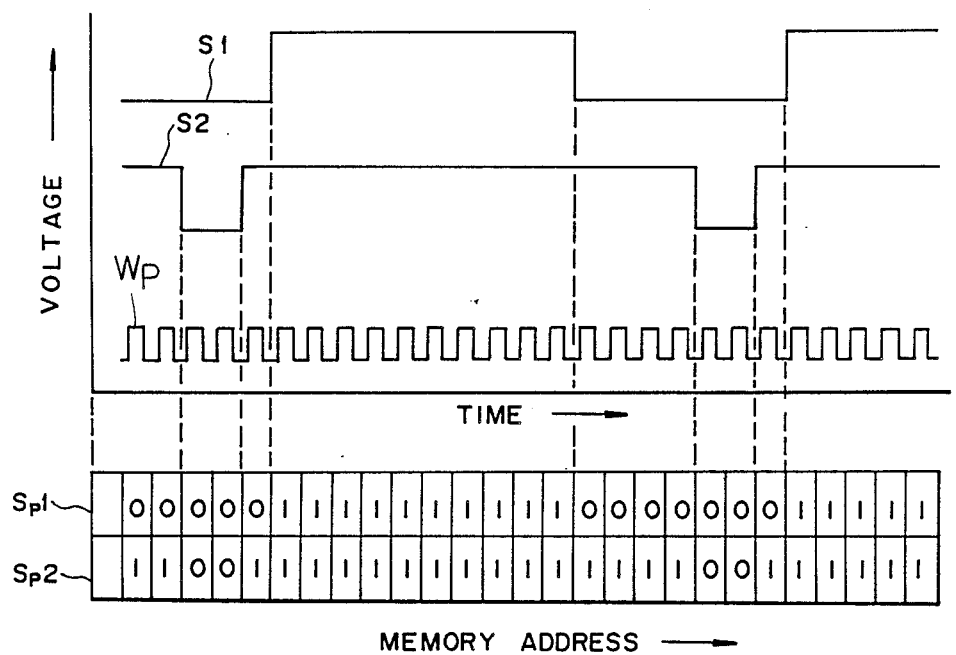
FIG. 2 is a view illustrating a timing relation among various portions of the embodiment of FIG. 1.

Referring to FIG. 2, a timing relation among the synchronizing signal, the video signals R, G, B, and the write pulse is illustrated, with time on the axis of abscissa and with signal voltage on the axis of ordinate.

In the figure, designated at S1 and S2 are signals delivered respectively from the first and second multiplexers 26, 27 which signals are here assumed to be the video signal and the horizontal synchronizing signal. Designated at Wp is a write pulse. Designated at Sp1 and Sp2 are respectively patterns of "1" and/or "0" written in the first and second static RAMs 29, 30 with use of the signals S1 and S2. Assumed here the write pulse Wp to be 10 MHz, the number of a train of successive "1" of the pattern Sp1 amounts to 10, leading to the pulse width of the signal S1 to measure 1000 ns. In addition, correlation between the signal S2 and the write pulse Wp informs us of a fact that the signal S2 decreases 400 ns after the trailing edge of the signal S1.

The maximum levels of the video signals R, G, B are already known, as described in the earlier stage of the second step. So, the reference voltage of the first D/A converter 23 is adjusted to an intermediate level of those video signals by subtracting the level only of the synchronizing signal component detected in the first step from the maximum levels of the video signals. Then, after setting the routes of the horizontal synchronizing signal input terminal 14, fifth relay 13, second buffer amplifier 21, second comparator 20, second multiplexer 27, and second static RAM 30, and of the R input terminal 10, relay 6, first buffer amplifier 19, first comparator 18, first multiplexer 26, and first static RAM 29, the third multiplexer 17 selects the output from the first comparator 18 to trigger the counter 32.

Furthermore, the reference voltage of the second D/A converter 24 is set to just intermediate voltage of the synchronizing signal level determined in the first step to check the signal patterns stored in the first and second static RAMs 29, 30. As illustrated in FIG. 2, since the counter 32 is triggered by the video signal output from the first comparator 18, the horizontal synchronizing pattern is stored in the second static RAM 30 a little later after the arrangement of an "1" pattern stored in the first static RAM 29 is complete (the time interval corresponds to front and back porches in a horizontal synchronizing period) the write clock Wc is thereupon assumed to be 10 MHz.

It is further judged whether the logic in use is a positive one or a negative one, on the basis of the probability of appearance of "1" and "0". Additionally, the horizontal synchronizing period is judged on the basis of correlation with the "1" pattern stored in the first static RAM, together with the determination of a horizontal synchronizing pulse width, existence of the front and back porches, and a video signal width (in a horizontal direction).

When a vertical synchronizing signal is inputted into the vertical synchronizing signal input terminal 16, the counter 32 is triggered by the video signal from the first comparator 18 selected through the route of the vertical synchronizing signal input terminal 16, third buffer amplifier 15, third comparator 22, second multiplexer 27, and second static RAM 30, together with the use of 100 kHz as the write clock Wc from the pulse generator 33. With the same processing as in the previous case of the horizontal synchronizing signal input terminal 14, logic in use, vertical synchronizing period, vertical synchronizing pulse width, front and back porches, video signal width (horizontal) are also judged here.

Provided a composite synchronizing signal is inputted into the horizontal synchronizing signal input terminal 14, a vertical synchronizing signal VT separated from the CPU trigger signal Tr is employed as the trigger for the counter 32 to effect the same measurement.

Processing of a composite video signal is as follows. The routes of the R input terminal 10, relay 6, first buffer amplifier 19, first comparator 18, first multiplexer 26, and first static RAM 29, and of the B input terminal 12, fourth relay 9, second buffer amplifier 21, second comparator 20, second multiplexer 27, and second static RAM 30 are set, and the output from the first comparator 18 is selected as a trigger for the counter 32. The reference voltages of the first and second D/A converters 23 and 24 are since having already been known in the first step, adjusted to the intermediate level of the video signal. Furthermore, same method of measurement as in the following separate synchronization type is applied.

Third Step

Judgement of interlace or non-interlace.

Completion up to the second step in the present embodiment enables even input signals such as composite ones or those of composite synchronizing type to be all converted to video signals of separate synchronizing type.

Here, a separated vertical synchronizing signal is provided as the CPU trigger signal Tr provided the vertical synchronizing signal VT is separated from the beginning, it is provided through the route of the vertical snchronizing signal input terminal 16, third buffer amplifier 15, third comparator 22, and third multiplexer 17 and used to trigger the counter 32 after passing through the third multiplexer 17. Furthermore, the first multiplexer 26 receives an output signal from the second comparator 20, the output signal including a horizontal synchronizing signal component and being yielded when the second D/A converter 24 is set in its reference voltage, and writes it in the first static RAM 29 at the clock rate of 10 MHz. The write operation is effected by two successive vertical synchronizing signal trigger, and time intervals until successive horizontal synchronizing pulses appear are compared. The same time interval is judged to be non-interlace, while different ones are judged to be interlace.

Once the type, logic, and level of an input video signal are judged in the present embodiment, color video input signals R, G, B, HT, and VT are converted to a particular format and printed on a printing sheet of paper as a color image in conforming with the particular format.

According to the present embodiment, variations of a R, G, B color video signal format are judged, and converted corresponding thereto for color printing. Hereby, the present embodiment of the video hard copying apparatus is made connectable to varieties of computers.

In what follows, a second embodiment of the video signal hard copying apparatus of the present invention will be described.

The second embodiment discloses in particular an automatic setting apparatus for a video signal sampling clock for use in a video signal hard copying apparatus according to the present invention.

Figure 3:
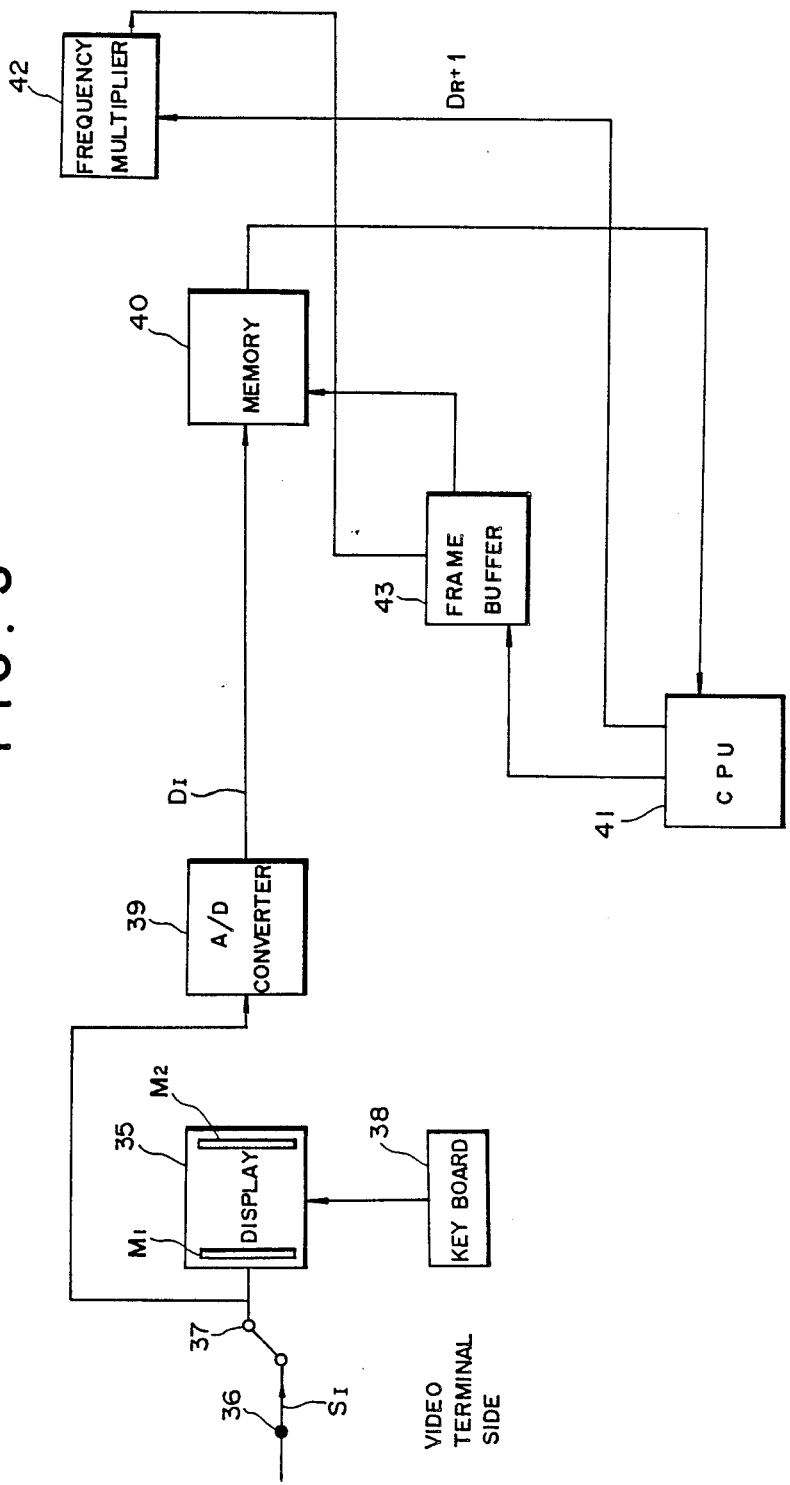
FIG. 3 is a block diagram illustrating a second embodiment of the video signal hard copying apparatus according to the present invention.

Referring to FIG. 3, the second embodiment is illustrated in the form of a simplified block diagram.

Figure 8:
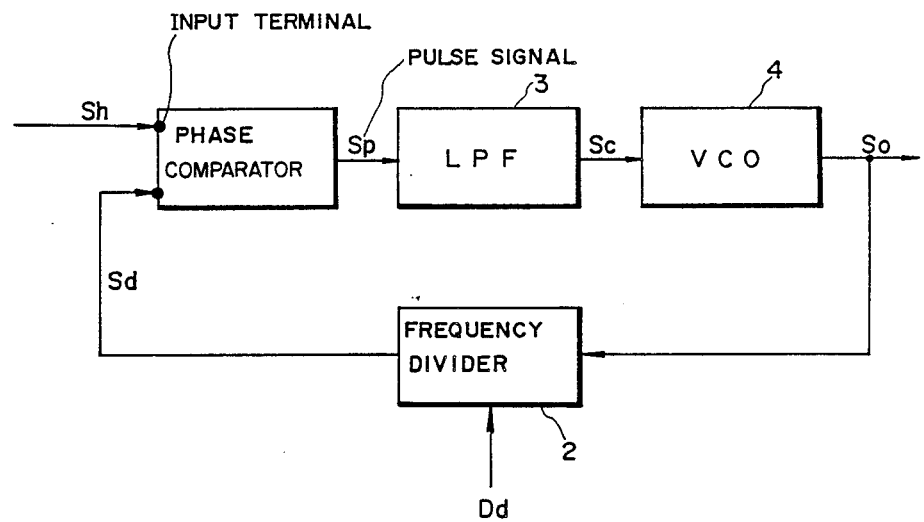
FIG. 8 is a block diagram illustrating a frequency multiplier circuit in combination of a PLL with a frequency divider.

In the same figure, image information $S_I$ is inputted into a A/D converter 39 from a video terminal side. The image information including the drawn distance is sent to an A/D converter 39 and converted in the same to digital image information. The digital image information $D_I$ is transmitted to a memory 40. The memory 40 stores therein the digital image information $D_I$ including the drawn distance at a location therein specified corresponding to the drawn distance. The memory 40 is connected to a frame buffer 43 (write address control means). The frame buffer 43 transmits address information to the memory 40 to set the location. The CPU 41, as the storage state judging and adjusting means, judges whether or not the image information corresponding to the marks M1 and M2 or the drawn distance is stored at the correct location in the memory 40, and adjusts, generates and transmits an expectation address to the frame buffer 43. The expectation address is to permit the frame buffer 43 to generate a write address signal incrementing stepwise from the foregoing first address to control the memory write operation, until the image information corresponding to the mark distance is coincident with the information stored at the location in the memory 40. The CPU 41 is further connected to the frequency multiplier 42 for delivering a frequency dividing ratio setting signal $D_R$ to the same, and increasing the signal $D_R1$ at a time until the coincidence is attained. The frequency multiplier 42 is a known as already described with reference to FIG. 8. It receives a horizontal synchronizing signal involved in the image information $S_I$ transmitted from the external video terminal side, the dividing ratio setting signal, and automatically adjusts and generates a sampling clock for the image signal $S_I$ on the basis of the dividing ratio setting signal delivered from the CPU 41. The sampling clock $S_{c1}$ is transmitted to the frame buffer 43 for incorporating the video signal $S_I$ from the external video terminal side. The CPU 41 thus executes the aforementioned judgement, and completes its operation when a correct sampling clock is established, i.e., the drawn mark distance, the marks being carried by the image information $S_I$ sampled as described above is coincident with the location defined by the expectation address generated by the CPU 41 through the frame buffer 43.

Figure 4A:
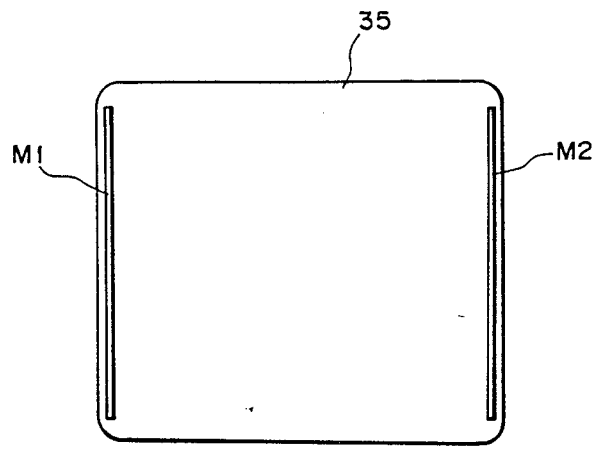
FIGS. 4(A), 4(B) are views of CRT display screens illustrating the second embodiment of FIG. 3.
Figure 4B:
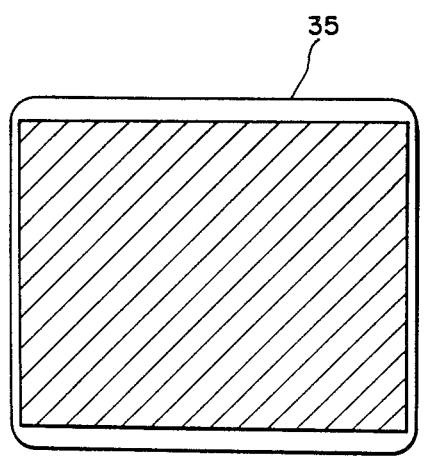

Referring here to FIG. 4(A), the display 35 is illustrated. The display 35 displays thereon the marks M1 an M2 at the left and right sides, both marks M1 and M2 being separated by a predetermined distance, the drawn distance described previously. Furthermore, the display 35 may display thereon the portion interposed between both marks M1 and M2 as illustrated in the hatched portion in FIG. 4(B).

Referring further to FIG. 5, the video signal $S_I$ corresponding to one raster is illustrated, including image information corresponding to the above-described marks M1 and M2.

Furthermore, at FIG. 6(a) the digital video signal converted to the digital data $D_I$ through the A/D converter 39 is illustrated, at FIG. 6(b) the sampling clock generated by the frame buffer 43 for sampling the above-discribed digital video signal illustrated, and at FIG. 6(c) the sampling data, i.e., the digital video signal $D_I$ of FIG. 6(a) is illustrated.

Figure 7:
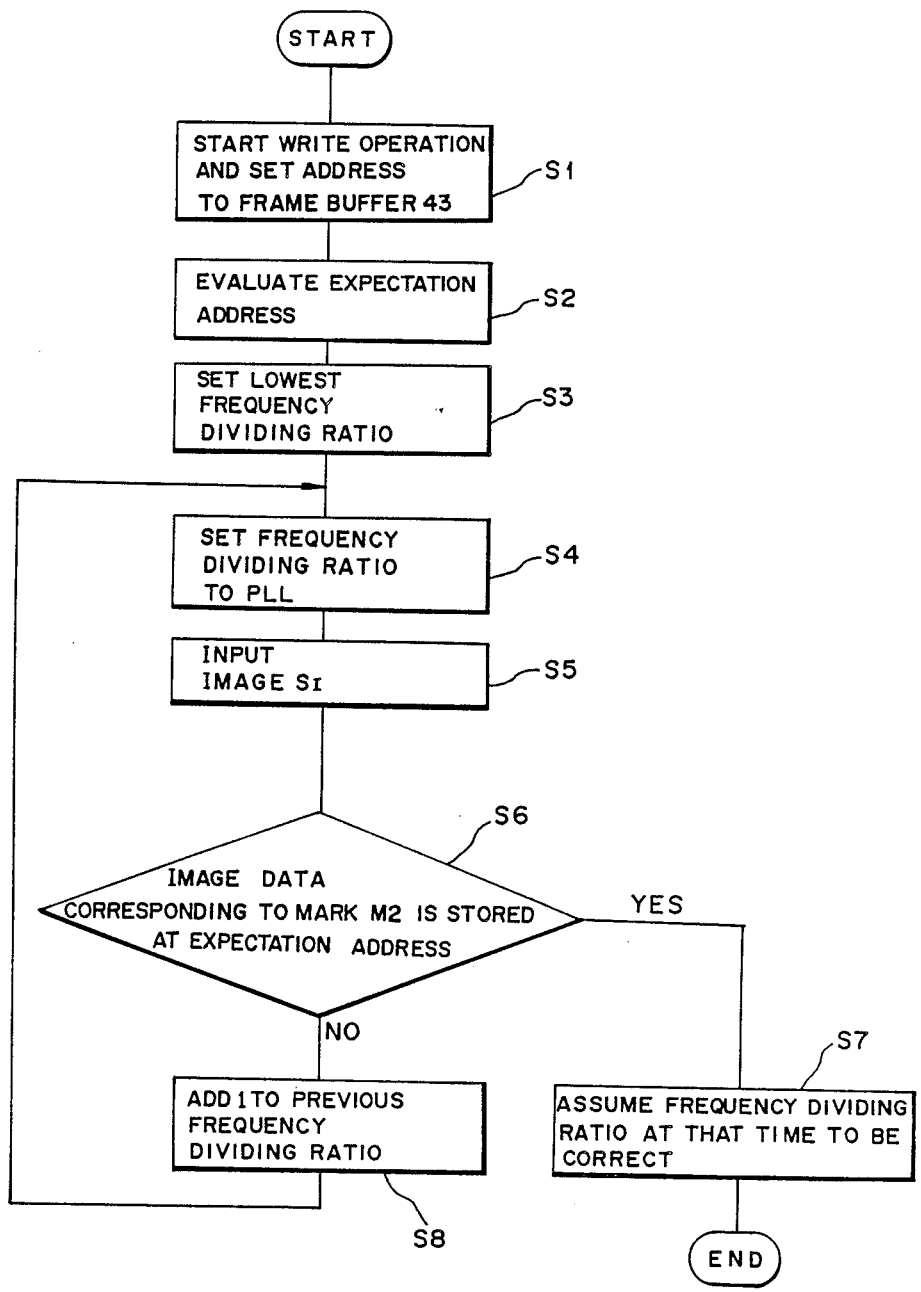
FIG. 7 is a flowchart for execution of the second embodiment of the present invention wherein the sampling clock is automatically set.

In the following, the operation of the second embodiment will be described with reference to FIG. 7 illustrating a flowchart executed by the CPU 41.

In step S1, the CPU 41 starts the write operation into the memory 40, and sets the first address to the frame buffer 43. That is, it sets to the frame buffer 43 the first address of the memory 40 (first address among the addresses where data corresponding to one horizontal synchronizing signal is stored) where the image data corresponding to the mark M1 drawn on the display 35 at the left end thereof is stored.

In step S2, the CPU 41 estimates the expectation address of the memory 40 where the image data corresponding to the mark M2 drawn on the display 35 at the right end thereof is stored, on the basis of the marks M1 and M2 drawn on the display 35 and the drawn distance data stored in the memory 40. The expectation address is that in the memory 40 where the image data corresponding to the mark M2 is stored.

In step S3, the CPU 41 evaluates approximate frequency dividing ratios and further the lowest one thereamong.

In step S4, it sets the frequency dividing ratio evaluated in the step S3 to the frequency multiplier 42 to lock the PLL. The frequency multiplier 42 hereby generates a sampling clock corresponding to the frequency dividing ratio set as such.

In step S5, the image signal $S_I$ is incorporated from the external video terminal by the sampling clock generated in the step S4.

In step S6, the CPU 41 judges whether or not the image data corresponding to the mark M2 is stored at the expectation address estimated in the step S2. If the result is "Yes", the CPU 41 advances to step S7 where the frequency dividing ratio set to the frequency multiplier 4 is assumed to be correct.

On the other hand, if in step S6, the result is "No" the CPU 41 advances to step S8 where it adds 1 to the frequency dividing ratio set to the frequency dividing ratio set to the frequency multiplier 42, and sets it to the same. Such operation from S4 to S8 is repeated for estimation of the optimum frequency dividing ratio until the CPU 41 confirms that the image data corresponding to the mark M2 is stored at the expectation address estimated in the step S2.

According to the first aspect of the present invention, as described above, the D/A converter means generate the reference voltages changing stepwise. The comparator means composes input R, G, B color video signals including horizontal and vertical synchronizing signals with the reference voltages generated by the D/A converter means and output digital signal patterns of "1s" and/or "0s". Those digital signal patterns assure the scanning system, logics and signal levels of the input R, G, B color video signals, from which information the R, G, B color video signals are decoded to permit a color image to be printed on a copying sheet of paper. Thus the video signal hard copying apparatus of the present invention can supply automatically and adoptively to varieties of computers a unknown signal output from the video terminal possessing various characteristics such as signal levels, logics scanning system without requiring particular measuring instruments, circuits and complicated adjustments and further without requiring skilled persons, resulting in the cost reduction and unification of such copying apparatus.

According to the second aspect of the present invention, as described above, the display means displays marks thereon separated by a predetermined drawn distance, which distance is stored in the memory means. The storage state judging and adjusting means judges whether or not the drawn distance is stored at a correct location in the memory means which location is estimated by the storage state judging and adjusting means itself, and further outputting a frequency dividing ratio setting signal to frequency multiplier means which means generates a sampling clock for sampling the input video signal. The sampling clock is employed for the foregoing judgement by the foregoing storage state judging and adjusting means until a correct sampling clock is attained. Thus, a sampling clock possessing the same phase and frequency as those of a video signal on the side of a video terminal can be automatically generated on the side of the hard copying apparatus.

Although certain preferred embodiments have been shown and described, it should be understood that many changes and modifications may be made therein without departing from the scope of the appended claims.

What is claimed is:

1. An automatic setting apparatus for generating a video signal sampling clock for use in a video signal copying apparatus for printing a hard copy based on an input color video signal including color signals R, G, B and horizontal and vertical synchronizing signals, the automatic setting apparatus comprising:
   (a) display means for displaying thereon predetermined marks involved in the video signal being input;
   (b) memory means, coupled to the display means, for storing a predetermined distance and for permitting first and second addresses thereof at which first and second marks are stored to be specified corresponding to the predetermined distance stored therein;
   (c) frequency multiplier means composed of a phase-locked loop and a frequency divider for receiving the horizontal synchronizing signal and a frequency dividing ratio setting signal, and for automatically adjusting and generating a correct sampling clock for the color video signal on the basis of the frequency dividing ratio setting signal;
   (d) write address setting means, coupled to the memory means, for setting the first address to the memory means so as to coincide with an address at which one end of the predetermined distance corresponding to the first mark is stored upon starting of the operation from the outside therethrough, and for thereafter generating the second address incrementing stepwise and setting the same to the memory means; and
   (e) storage state judging and adjusting means, coupled to the display means, memory means, frequency multiplier means, and write address setting means, for judging whether the second address for the second mark coincides with the other end of the predetermined distance, on the basis of the image information concerning the first and second marks transmitted from the display means and the predetermined mark distance information transmitted from the memory means, and when no coincidence is judged, for adjusting, generating and transmitting an expectation address to the write address setting means and further transmitting the frequency dividing ratio setting signal corresponding to the expectation address to the frequency multiplier means, the write address setting means generating the second address on the basis of the expectation address to set it to the memory, until the second address coincides with the other end of the predetermined distance and hence until the frequency dividing ratio setting signal is correctly specified for generation of the correct sampling clock in the frequency multiplier means.

2. An automatic setting apparatus as recited in claim 1, wherein said display means displays thereon said first and second marks involved in the video signal being input at left and right ends thereof separated by said predetermined distance.

3. A video signal generating apparatus for generating a video signal for printing of a hard copy image based on an input color video signal, the input color video signal including R, G and B signals and horizontal and vertical synchronizing signals, said apparatus comprising:
   (a) first input selection means, having input thereto said R, G and B signals, for selecting and outputting one of said R, G and B signals as a first selected signal;
   (b) second input selection means, having input thereto said horizontal synchronizing signal and one of said R, G and B signals, for selecting and outputting one of said horizontal synchronizing signal and said one of said R, G and B signals input thereto as a second selected signal;
   (c) first, second and third digital-to-analog converter means for generating first, second and third stepwise changing reference voltages, respectively;
   (d) first comparator means, having inputs coupled to said first input selection means and said first digital-to-analog converter means, for comparing said first selected signal selected by said first input selection means and said first reference voltage, and for outputting a first logic train signal having logic values in accordance with the thus compared first selected signal and first reference voltage;
   (e) second comparator means, having inputs coupled to said second input selection means and said second digital-to-analog converter means, for comparing said second selected signal selected by said second input selection means and said second reference voltage, and for outputting a second logic train signal having logic values in accordance with the thus compared second selected signal and second reference voltage;
   (f) third comparator means, having a first input coupled to said third digital-to-analog converting means and having a second input for receiving said vertical synchronizing signal, for comparing said vertical synchronizing signal and said third reference voltage, and for outputting a third logic train signal having logic values in accordance with the thus compared vertical synchronizing signal and third reference value;
   (g) first multiplexer means, coupled to at least one of said first, second and third comparator means, for selecting and outputting one of said first, second and third logic train signals as a first digital signal;
   (h) second multiplexer means, coupled to at least one of said first, second and third comparator means, for selecting and outputting one of said first, second and third logic train signals as a second digital signal; and,
   (i) third multiplexer means, coupled to at least one of said first, second and third comparator means, for selecting and outputting one of said first, second and third logic trains as a third digital signal.

4. An apparatus as recited in claim 3, said first and second selection means comprising a plurality of relays.

5. An apparatus as recited in claim 3, said apparatus further comprising:
   first and second memory means, respectively coupled to said first and second multiplexer means, for respectively temporarily storing said first digital signal and said second digital signal; and,
   address generating means, coupled to said third multiplexer means and to said first and second memory means, for generating and outputting address locations to said first and second memory means in accordance with a trigger signal output by said third multiplexer means.

6. An apparatus as recited in claim 5, said first and second selection means comprising a plurality of relays.

* * * * *